(12) United States Patent
Pott et al.

(10) Patent No.: US 11,546,467 B2
(45) Date of Patent: *Jan. 3, 2023

(54) METHOD FOR ESTABLISHING A TELECOMMUNICATION CONNECTION

(71) Applicant: Unify GmbH & Co. KG, Munich (DE)

(72) Inventors: Philipp Pott, Munich (DE); Stefan Augustin, Hohenkirchen (DE)

(73) Assignee: Unify GmbH & Co. KG, Munich (DE)

( * ) Notice: Subject to any disclaimer, the term of this patent is extended or adjusted under 35 U.S.C. 154(b) by 27 days.

This patent is subject to a terminal disclaimer.

(21) Appl. No.: 16/909,191

(22) Filed: Jun. 23, 2020

(65) Prior Publication Data

US 2020/0336589 A1    Oct. 22, 2020

Related U.S. Application Data

(63) Continuation of application No. 15/351,766, filed on Nov. 15, 2016, now Pat. No. 10,735,583, which is a
(Continued)

(30) Foreign Application Priority Data

Apr. 5, 2013    (DE) .......................... 102013006569.0
Jun. 12, 2013   (DE) .......................... 102013009831.9

(51) Int. Cl.
    *H04M 3/48*    (2006.01)
    *H04M 3/42*    (2006.01)
    (Continued)

(52) U.S. Cl.
    CPC ......... *H04M 3/48* (2013.01); *H04M 3/42365* (2013.01); *H04M 3/432* (2013.01); *H04W 4/16* (2013.01); *H04M 2203/2072* (2013.01)

(58) Field of Classification Search
    CPC .... H04M 3/48; H04M 3/432; H04M 3/42365; H04M 2203/2072; H04W 4/16
    See application file for complete search history.

(56) References Cited

U.S. PATENT DOCUMENTS

| 5,276,731 A | 1/1994 | Arbel et al. |
| 6,035,031 A | 3/2000 | Silverman |
| (Continued) |

FOREIGN PATENT DOCUMENTS

| CN | 102148903 A | 8/2011 |
| DE | 19816275 A1 | 10/1999 |
| (Continued) |

OTHER PUBLICATIONS

Written Opinion of the International Searching Authority for PCT/EP2014/000881 dated Jul. 4, 2014 (Form PCT/ISA/237).
(Continued)

*Primary Examiner* — Marcus Hammonds
(74) *Attorney, Agent, or Firm* — Buchanan Ingersoll & Rooney PC

(57) ABSTRACT

The invention concerns a method for establishing a telecommunication connection between a calling subscriber (1) and a target subscriber (5), in which a calling terminal (R) of the calling subscriber (1) and a target terminal (Z) of the target subscriber (5) are assigned to a switching unit (100) and the calling subscriber (1) enters a callback request (CCBS-REQ, CCNR-REQ) in the switching unit (100) if the target terminal (Z) is busy or cannot be reached when a first call is made from the calling terminal (R) to the target terminal (Z), in which configuration data regarding the accessibility of the target subscriber (5) for a callback are entered into the switching unit (100). Then the time is set for the switching unit (100) to make the pending callback (RC) to the calling subscriber (1) in order to generate a second call to the target subscriber (5) by processing the configuration data concerning the accessibility of the target subscriber (5) for a callback, at a time when the target subscriber (5) is reachable for a callback. Next, the switching unit (100)
(Continued)

makes the pending callback (RC) to the calling subscriber (1) at the set time.

15 Claims, 2 Drawing Sheets

Related U.S. Application Data continuation of application No. 14/780,793, filed as application No. PCT/EP2014/000881 on Apr. 2, 2014, now Pat. No. 9,531,874.

(51) Int. Cl.
*H04M 3/432* (2006.01)
*H04W 4/16* (2009.01)

(56) References Cited

U.S. PATENT DOCUMENTS

| | | |
|---|---|---|
| 6,614,896 B1 | 9/2003 | Rao |
| 9,531,874 B2 * | 12/2016 | Pott .................. H04M 3/48 |
| 10,735,583 B2 * | 8/2020 | Pott .................. H04M 3/42365 |
| 2004/0242211 A1 | 12/2004 | Akhteruzzaman et al. |
| 2005/0012436 A1 | 1/2005 | Lai |
| 2005/0063527 A1 | 3/2005 | Bury et al. |
| 2006/0093116 A1 | 5/2006 | Baird |
| 2013/0293665 A1 | 11/2013 | Pang |

FOREIGN PATENT DOCUMENTS

| | | |
|---|---|---|
| DE | 102009023927 A1 | 12/2010 |
| EP | 0557777 A1 | 9/1993 |
| EP | 0781024 A2 | 6/1997 |
| WO | 0115419 A1 | 3/2001 |

OTHER PUBLICATIONS

International Search Report for PCT/EP2014/000881 dated Jul. 4, 2014 (Form PCT/ISA/210).
IEEE, LIS, Sophia Antipolis Cedex, European Telecommunication Standard, Terrestrial Trunked Radio (TETRA); Voice Plus Data (V+D); Part 10; Supplementary Services stage 1; Sub-part 23; Call completion on no reply, Nr. Second Edition, Sep. 1, 1999.

* cited by examiner

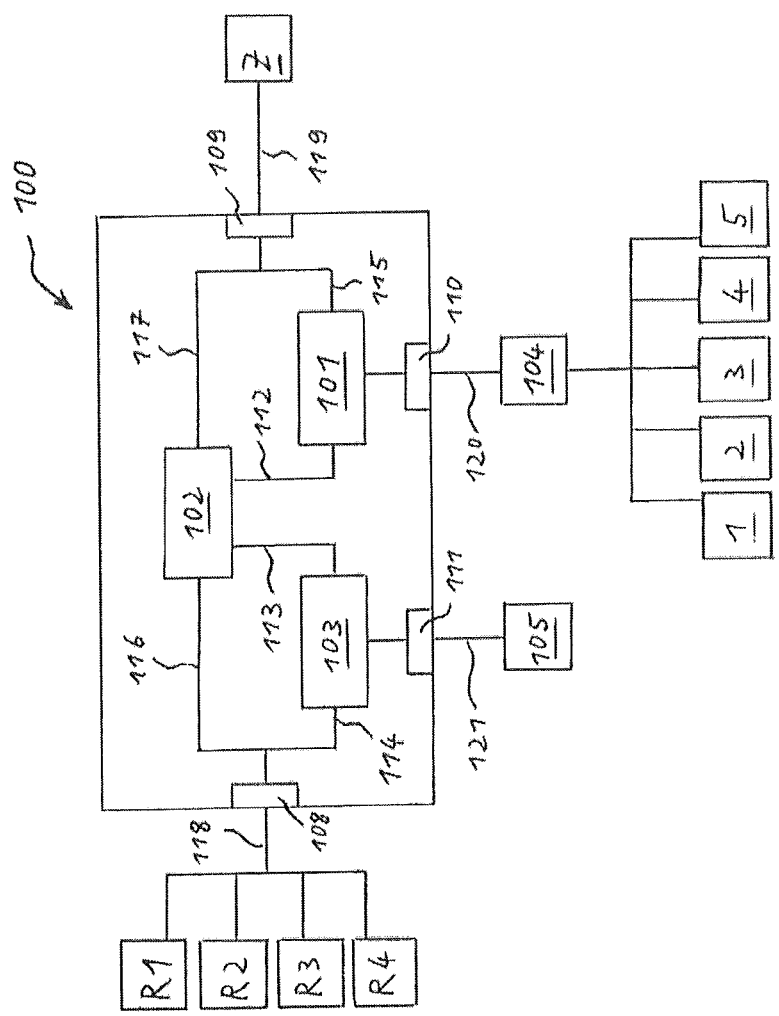

METHOD FOR ESTABLISHING A TELECOMMUNICATION CONNECTION

CROSS-REFERENCE TO RELATED APPLICATIONS

This application is a continuation application of U.S. patent application Ser. No. 15/351,766, which is a continuation application of U.S. patent application Ser. No. 14/780,793, which is the United States national stage under 35 U.S.C. § 371 of PCT International Application No. PCT/EP2014/000881, filed on Apr. 2, 2014, and claiming priority to German Patent Application No. 10 2013 006 569.0, filed on Apr. 5, 2013, and German Patent Application No. 10 2013 009 831.9, filed on Jun. 12, 2013.

BACKGROUND OF THE INVENTION

Field of the Invention

Embodiments relate to methods and systems for establishing a telecommunication connection between a calling subscriber and a target subscriber.

Background of the Related Art

By means of the callback function CCBS (Completion of Call to a Busy Subscriber), a caller, also called a calling subscriber, can have a switching unit establish a telecommunication connection to a temporarily busy terminal of a call recipient, also called a target subscriber. A calling subscriber who receives a busy signal from his target subscriber's terminal the first time he calls can leave a CCBS-REQ callback request in the switching unit before ending his call, e.g., by hanging up the receiver, using the keyboard of his terminal or by means of a message. If the target subscriber's temporarily busy terminal becomes free, e.g., by means of the completion of an ongoing conversation on the terminal, the calling subscriber's terminal receives a notification through the switching unit about the end of the ongoing conversation on the target subscriber's terminal. The calling subscriber's terminal then informs the calling subscriber, by means of a signal such as a special ring tone, that the target subscriber's terminal is no longer busy. The switching unit's call to the calling subscriber's terminal to inform the calling subscriber that the target subscriber's terminal is no longer busy is considered a callback. If the calling subscriber accepts this callback, which can be done by lifting a phone receiver, for example, then the switching unit calls the target subscriber again. The call made to the target subscriber by the switching unit to establish a connection between the calling subscriber and the target subscriber is considered a second call. CCBS cannot be used if the target subscriber refuses the call placed by the switching unit or if the target subscriber's switching center does not support callback functions.

Using the CCNR (Completion of Call on No Reply) callback function, a calling subscriber can have a switching unit establish a telecommunication connection with a target subscriber who does not accept a first call from the calling subscriber. A calling subscriber whose target subscriber is using a terminal that gives a ringback tone to the calling subscriber, when the calling subscriber's call is not accepted, can activate the CCNR callback function by leaving a CCNR-REQ callback request in the switching unit before the end of the first call, e.g., by hanging up the receiver, using the keyboard of his terminal or by means of a message.

If the target subscriber ends a conversation after activation of CCNR, e.g., by hanging up the telephone receiver on his terminal, the calling subscriber's terminal receives a notification of the end of the target subscriber's conversation through the switching unit. The terminal then informs the calling subscriber, by means of a signal such as a special ring tone, that the target subscriber's terminal can be reached. The switching unit's call to the calling subscriber's terminal to inform the calling subscriber that the target subscriber's terminal can be reached is also considered a callback with CCNR, comparable to the definition of a callback for CCBS. If the calling subscriber accepts this callback, e.g., by lifting the receiver of his terminal, then the calling subscriber will be connected with the desired target subscriber's terminal by the switching unit in a second call. CCNR cannot be used if the target subscriber refuses the call placed by the switching unit or if the target subscriber's switching center does not support callback functions.

CCBS-REQ, CCNR-REQ callback requests that are left in the switching unit using the CCBS and/or CCNR callback functions are deleted from the switching unit with no notification to the calling subscriber if the callback fails or after a preset length of time stored in the switching unit, e.g., one hour. A standard switching unit can process multiple CCBS-REQs and/or CCNR-REQs in the order in which they were placed in the switching unit.

EP 1 156 648 A2 describes a method for establishing a telecommunication connection in which, if a second call is placed as an answer to the requested callback from a calling terminal to a target terminal and the target terminal becomes busy again in the meantime, the call is placed in a waiting area assigned to a switching unit for at least a preset length of time, in order to wait for the target terminal to become free again, without the calling terminal receiving a busy signal. During the time that the second call directed from the calling terminal to the target terminal is held in the switching unit's waiting area, a ringing tone, hold music, recorded voice message, or other suitable indicator is played to the calling terminal. As soon as the target terminal becomes free, within the preset length of time, the connection to the target terminal is displayed on the calling terminal. A disadvantage is that, during the time that the second call is being held in the switching unit's waiting area, the calling terminal is busy for other calling subscribers, although no communication occurs via the connection established with the second call. If the hold time for the target terminal to become free again, i.e., the preset length of time in which the second call is held in the switching unit's waiting area, expires without success, a connection between the calling terminal and the target terminal through the requested callback is not established.

Proceeding from the foregoing, the problem addressed by the invention is that of creating a method for establishing a telecommunication connection that avoids the disadvantages of the prior art. In particular, it should be a method for establishing a telecommunication connection in which a connection is established between the calling subscriber and the target subscriber by means of the callback requested by the calling subscriber, wherein the calling subscriber remains reachable by other calling subscribers until the connection to the target subscriber is established.

BRIEF SUMMARY OF THE INVENTION

Embodiments relate to methods for establishing a telecommunication connection between a calling subscriber and a target subscriber, in which a calling terminal of the calling subscriber and a target terminal of the target subscriber are assigned to a switching unit and the calling subscriber enters a callback request in the switching unit, if the target terminal is busy or cannot be reached when a first call is made from the calling terminal to the target terminal. The invention further concerns a transmission unit for establishing such a telecommunication connection.

According to the invented method for establishing a telecommunication connection between a calling subscriber and a target subscriber, in which a calling terminal of the calling subscriber and a target terminal of the target subscriber are assigned to a switching unit and the calling subscriber enters a callback request in the switching unit, if the target terminal is busy or cannot be reached when a first call is made from the calling terminal to the target terminal, configuration data about the target subscriber's accessibility through a callback are entered into the switching unit. Then the time for placing the callback being made by the switching unit to the calling subscriber in order to generate a second call to the target subscriber is determined by processing the configuration data concerning the target subscriber's accessibility for a callback and set to a time when the target subscriber is reachable by a callback. After that, at the set time, the callback from the switching unit to the calling subscriber is made. The problem addressed by the present invention is solved by this device for the same reasons as the ones stated above for the corresponding method. Unlike the standard method for generating a callback, with which the target subscriber remains reachable only if he does not accept the callback, by entering configuration data into the switching unit the target subscriber can establish his accessibility for a callback before the callback occurs. The time of the callback is no longer determined by the end of the target subscriber's conversation that is preventing the callback, but instead by processing the configuration data entered into the switching unit. For example, even if the target subscriber's terminal is free, a callback from the switching unit to the calling subscriber can be prohibited if the configuration data state that a callback is prohibited at the time when the target subscriber's terminal is free.

BRIEF DESCRIPTION OF THE FIGURES

FIG. 2 shows a schematic diagram of a switching unit according to one exemplary embodiment of the invention.

DETAILED DESCRIPTION OF THE INVENTION

Figure 1:
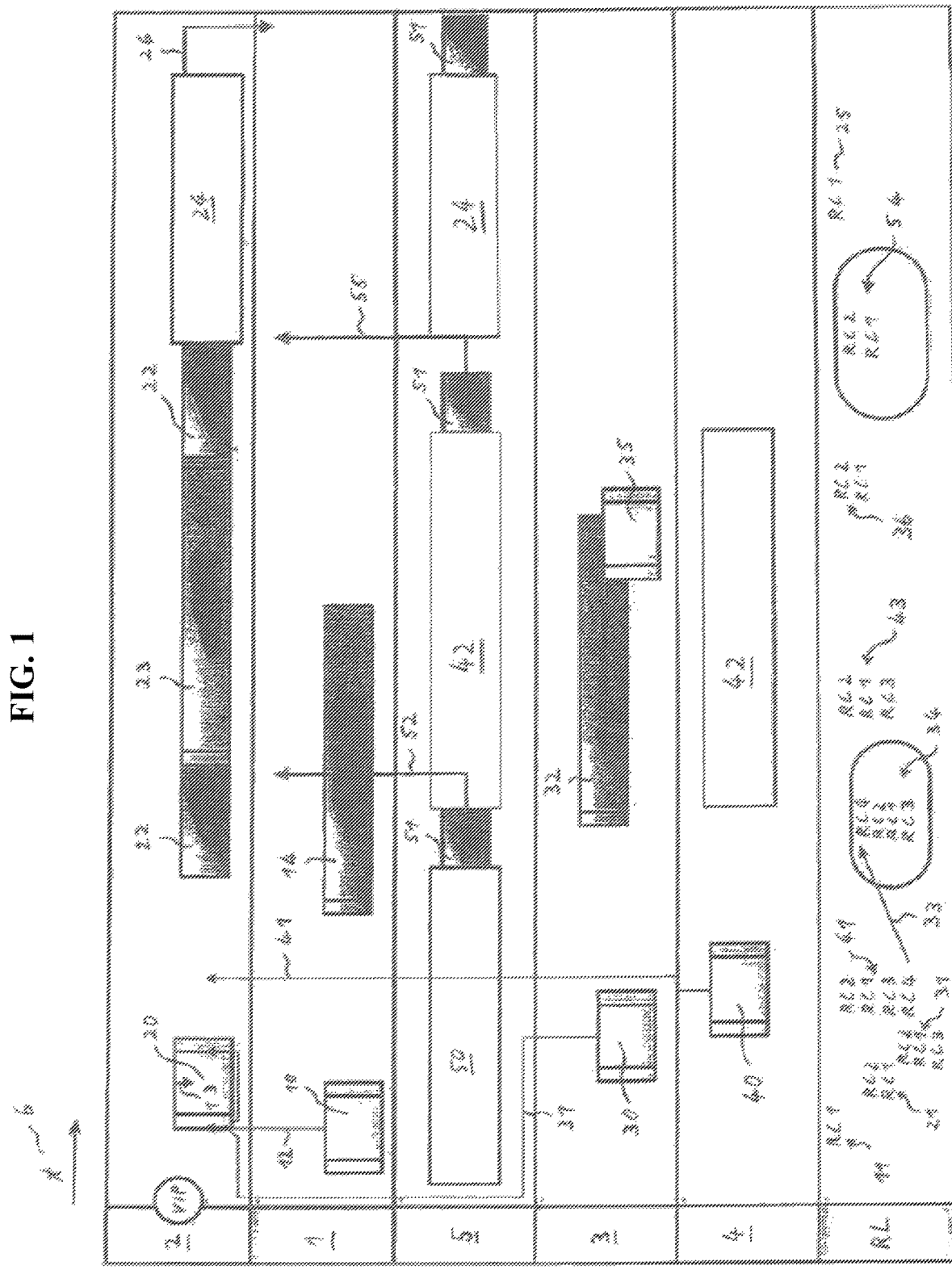
FIG. 1 shows the chronological progression of a communication between four calling subscribers, each of whom has left a callback request in a switching unit for establishing a connection to the same target subscriber, and that target subscriber.

According to the invented method for establishing a telecommunication connection between a calling subscriber and a target subscriber, in which a calling terminal of the calling subscriber and a target terminal of the target subscriber are assigned to a switching unit and the calling subscriber enters a callback request in the switching unit, if the target terminal is busy or cannot be reached when a first call is made from the calling terminal to the target terminal, configuration data about the target subscriber's accessibility through a callback are entered into the switching unit. Then the time for placing the callback being made by the switching unit to the calling subscriber in order to generate a second call to the target subscriber is determined by processing the configuration data concerning the target subscriber's accessibility for a callback and set to a time when the target subscriber is reachable by a callback. After that, at the set time, the callback from the switching unit to the calling subscriber is made. The problem addressed by the present invention is solved by this device for the same reasons as the ones stated above for the corresponding method. Unlike the standard method for generating a callback, with which the target subscriber remains reachable only if he does not accept the callback, by entering configuration data into the switching unit the target subscriber can establish his accessibility for a callback before the callback occurs. The time of the callback is no longer determined by the end of the target subscriber's conversation that is preventing the callback, but instead by processing the configuration data entered into the switching unit. For example, even if the target subscriber's terminal is free, a callback from the switching unit to the calling subscriber can be prohibited if the configuration data state that a callback is prohibited at the time when the target subscriber's terminal is free.

In a preferred embodiment of the invention, callbacks made by the switching unit to at least two calling subscribers to generate a second call to the target subscriber are prioritized by processing the configuration data concerning the target subscriber's accessibility by a callback. The time for making the callback placed by the switching unit to each of the at least two calling subscribers is then determined by the prioritized sequence for callbacks to be made. In the switching unit, multiple CCBS-REQ and/or CCNR-REQ callback requests are not simply processed in the chronological order in which they were placed in the switching unit, but instead the sequence of callbacks being made is determined by the switching unit processing the configuration data. Processing can be done automatically by the switching unit when multiple callback requests for generating a second call to the target subscriber have been made.

Advantageously, after the callback request is made, an acknowledgement message from the switching unit to the calling subscriber regarding the target subscriber's accessibility can be generated. By processing the configuration data, the switching unit can determine the times at which there is not a high enough probability of successfully establishing a connection with a callback. For example, the switching unit can send the calling subscriber a message immediately after his callback request is entered in the switching unit, saying that the target subscriber is not reachable for the next two hours. The message returned from the switching unit to the calling subscriber is sent before the callback is made and can be audible, such as a recorded voice message, and/or visual, such as text on the calling subscriber's terminal screen.

In another embodiment of the invention, the configuration data can be changed by the target subscriber. For example, the target subscriber can enter certain time frames when he is reachable for a callback, also called "Communication Time Slots," into the configuration data. The target subscriber can view and change the configuration data for determining the automatic callback prioritization, and in this way plan the callbacks he will receive. The target subscriber's callback planning for the CCBS (CCBS planning) and CCNR (CCNR planning) callback functions is based on access to the configuration data entered in the switching unit. The configuration data can be accessed through the target subscriber's terminal keyboard or through the keyboard of a computer connected to the switching unit. Using a speech recognition function available in the switching unit, the configuration data can also be accessed through the target subscriber's terminal or with a microphone connected to the target subscriber's computer by means of spoken instructions. It is also possible to include a router between the computer used to access the configuration data and the switching unit. The switching unit can be integrated into a router. The switching unit can be implemented in a hardware and software element or only a software element on a computer or router. In addition to the target subscriber, the calling subscriber can also perform CCBS planning and/or CCNR planning, e.g., by entering data into the configuration data regarding time periods during which he is reachable for a callback.

Advantageously, data regarding a higher-priority calling subscriber for making callbacks can be entered into the configuration data. In this way, the target subscriber can define so-called VIP calling subscribers (VIP: Very Important Person) in the configuration data, who are called back before other calling subscribers even when another calling subscriber has placed his callback in the switching unit earlier than the VIP calling subscriber has.

Preferably, data are entered into the configuration data regarding a time period in which the target subscriber and/or the calling subscriber is/are reachable or unreachable for callbacks. For example, this allows the subscribers to plan their conversation activities on the communication connection to be established such that, before a planned call and/or after a completed call, no callback is made for a configurable length of time. Closed times, in which no callbacks are made even if the terminal is free, can be entered into the configuration data by both the calling subscriber and the target subscriber.

In a preferred embodiment of the invention, data regarding an activity status for the target subscriber and/or the calling subscriber managed outside of the switching unit (externally) are entered into the configuration data via a first interface provided in the switching unit. For example, multiple callbacks to be made to a target subscriber are prioritized by the switching unit through processing externally managed activity messages to the calling subscriber and/or the target subscriber.

It is especially advantageous to include data from a day planner for the target subscriber and/or the calling subscriber in the activity status data. Activity status messages can include presence information, i.e., information concerning the current availability of the calling or target subscriber, or, for example, data from the day planner of any subscriber for the callback to be made. The data from the day planner can be taken from software programs such as Lotus Notes or Microsoft Outlook and added to the configuration data in the switching unit. Access to the activity status messages can be through the switching unit, wherein, for example, the access times and rights are entered into the switching unit. The access data entered can be available only to the respective calling or target subscriber or to an administrator with the consent of the relevant calling or target subscriber.

The activity status data can include data that are generated by a computer for the purpose of recording and reporting the target subscriber's and/or the calling subscriber's user activities. Activity status messages can include data that are prepared by a computer-based unit and/or a software element for recording and reporting user activities. For example, by observing keyboard entries in conjunction with analyzing the location based on the network status of the computer-based unit and/or software element, it can be determined whether the user who is the target subscriber is located in his office environment and should be reachable for a calling subscriber. If, when the activity status data are called up, the user is using a software program that can conduct a conference call or join a conference call, such as the Netmeeting program, it can be assumed that the user is currently participating in a conference call and so a connection through a callback should not be made at this time. Other indicators of a poor time for establishing a connection to the target subscriber through a callback can be that the user is having his calls forwarded from his landline telephone to a mobile phone at the time when the activity status data are called up, or that room sensors report a visitor in the user's office to the computer-based unit and/or the software element for recording and reporting user activities. In another embodiment of the invention, using mobile terminals, it is possible to report activity status messages through a user-related software program, also called a client application, for storage and forwarding of information concerning the current availability of the calling or target subscriber to the switching unit or a presence server, which is sending these activity status messages to the switching unit. For example, with a wired or wireless connection between a mobile terminal and a hands-free speaker device, installed in a vehicle, for example, and in particular with a wireless Bluetooth connection, the activity status message "in vehicle" can be sent back to the switching unit by the computer-based unit and/or the software element for recording and reporting user activities. In addition, through a connection to a navigation device in the vehicle, the computer-based unit and/or software element for recording and reporting user activities can send the likely future time when the driver will reach his destination, such as the office with the terminal called by the calling subscriber, back to the switching unit.

In a preferred embodiment of the invention, a callback request is sent from the switching unit to a date planning system or conference system managed outside of the switching unit. In this way, a CCBS-REQ; CCNR-REQ callback request can be sent as an appointment request or appointment query from the switching unit into a date planning system, for example into a software program like Lotus Notes or Microsoft Outlook. The appointment request can be entered as a meeting appointment in the date planning system, where it can be entered as an e-mail or SMS (Short Message System).

It is especially advantageous to block the calling subscriber's calling terminal and the target subscriber's target terminal against other calls before placing the current callback. As a preparatory measure for a callback, using a Mutex function, for example, the switching unit can block incoming calls to the calling and target subscriber other than the current callback. Blocking incoming calls to the calling and target subscriber before establishing the callback connection guarantees that the terminals of both participants in the connection are free when the connection resulting from the callback is established.

In another preferred embodiment of the invention, an entered callback request can be deleted from outside of the switching unit before the callback is made, using a second interface provided in the switching unit. Because of the ability to delete a CCBS-REQ; CCNR-REQ callback request entered into the switching unit before the callback occurs, also called a CCBS or CCNR cancellation, the calling subscriber can prevent accidental callbacks. For example, when executing a business process through which a callback request was entered in the switching unit, it may be that after the callback request is left there is no longer an interest in establishing a connection with the target subscriber, if another conversation participant was contacted while executing the business process. CEBP processes (Communication Embedded Business Processes), in which automated telephone connections are made, can be or include business processes in which, after leaving a callback request during the process, later process steps or communication steps have already taken place that make a callback unnecessary.

The invention furthermore describes a switching unit for establishing a telecommunication connection between a calling subscriber and a target subscriber, in which a calling terminal of the calling subscriber and a target terminal of the target subscriber are assigned to a switching unit and the calling subscriber can enter a callback request in the switching unit, if the target terminal is busy or cannot be reached when a first call is made from the calling terminal to the target terminal, wherein the switching unit has a first memory unit for entering configuration data about the target subscriber's accessibility for a callback. The switching unit further includes a processing unit that sets the time for placing the callback being made by the switching unit to generate a second call to the target subscriber, by processing the configuration data concerning the target subscriber's accessibility for a callback, to a time when the target subscriber is reachable by a callback. The switching unit is configured such that the callback from the switching unit to the calling subscriber is made at the set time.

In a preferred embodiment of the invention, the processing unit is configured such that callbacks to be made by the switching unit to at least two calling subscribers to generate a second call to the target subscriber can be prioritized by processing the configuration data concerning the target subscriber's accessibility for a callback. The time for making the callback placed by the switching unit to each of the at least two calling subscribers to place the second call to the target subscriber is then determined by the prioritized sequence for callbacks to be made. According to the invention, the switching unit is able to prioritize the callbacks entered in the switching unit. For multiple callback requests to establish a connection to a target subscriber, the engagement situation and current availability, also called the presence situation, can already be considered automatically before the switching unit places a callback, so that unnecessary callback attempts are not made. Callback requests can be given higher priority by the switching unit if one of the callback participants communicates through an open connection immediately before the time of prioritization and therefore can be reached in his office and on the assigned terminal in the office. The planned time for establishing the connection through the second call is not limited to the current time or to a specific future time, but rather can be the best time for a successful second call by means of a callback, depending on each callback participant's individual situation.

In an advantageous embodiment of the invention, the callback request is stored in the form of a callback to be made by the switching unit in a callback list in a second storage unit in the switching unit. Here the callback list includes callbacks to be made by the switching unit for generating a second call to the target subscriber. All calling subscribers to a target subscriber are stored in the callback list. Access to the second storage unit is possible from outside of the switching unit, so that callbacks stored in the callback list can be deleted before they occur. The callback list is updated continuously by the processing unit, whereby the processing unit changes the callback list appropriately when the callbacks are prioritized, uses and processes the callbacks with the highest priority in the callback list, and removes placed and completed callbacks from the callback list.

Additional exemplary embodiments and also advantages of the invention will be explained below with reference to the figures. For better illustration, a scale or true proportional representation is not used in the figures. Unless specifically stated otherwise, the same reference numbers in the figures denote the same components with the same meaning.

An embodiment is now explained using the example of a communication between multiple calling subscribers who want to reach the same target subscriber and that target subscriber. FIG. 1 shows the chronological progression of a communication between four calling subscribers 1, 2, 3, 4, each of whom has left a callback request 10, 20, 30, 40 in a callback list RL of a switching unit for establishing a connection to the same target subscriber 5, and that target subscriber 5. FIG. 1 is divided into six rows, which from top to bottom schematically show the communication process for calling subscribers 2 and 1, the target subscriber 5, calling subscribers 3 and 4, and the callbacks RC1, RC2, RC3, and RC4 entered into the callback list RL. The time axis 6 runs from left to right in FIG. 1.

At the beginning of the communication between the calling subscribers 1, 2, 3, 4 and the target subscriber 5, the target subscriber is on a telephone call 50 with someone other than the calling subscribers 1, 2, 3, 4, so the terminal of the target subscriber 5 sends a busy signal to the terminals of each of the calling subscribers 1, 2, 3, 4. The target subscriber 5 could also be at a business meeting away from his office and therefore not reachable. In this case, the terminal of the target subscriber 5 sends a dial tone to the terminals of each of the calling subscribers 1, 2, 3, 4. Calling subscriber 1 wants to establish a connection to target subscriber 5 and, because the terminal of the target subscriber 5 is busy, leaves a callback request 10 in the form of a callback RC1 in the callback list RL of the switching unit. Only one callback RC1 is stored as element 11 in the callback list RL.

In the sequence that occurs next, calling subscriber 2 wants to establish a connection to target subscriber 5 and initiates, as shown by arrow 12, a callback request 20, which shortly thereafter, as shown by arrow 13, is stored in the form of a callback RC2 in the callback list RL. Calling subscriber 2 is a particularly important person (VIP) for the target subscriber 5 and therefore a high-priority calling subscriber for the target subscriber 5 to call back. The information that the calling subscriber 2 is a high-priority calling subscriber for the target subscriber 5 to call back is entered into the switching unit's configuration data and causes the pending callback RC2 in the list content 21 of the callback list RL to be prioritized over RC1, although the callback RC2 was entered in the callback list RL later than the callback RC1.

The terminal of the target subscriber 5 is still busy, so the callback request 30 from calling subscriber 3 is initiated after the initiation of the callback request 20 (see arrow 31) and is entered in the list content 31 as pending callback RC3, which follows the pending callbacks RC2 and RC1. The terminal of the target subscriber 5 is still busy, so the callback request 40 from calling subscriber 4 is initiated after the initiation of the callback request 30 (see arrow 41) and is entered in the list content 31 as the last callback RC4, which follows the pending callbacks RC2, RC1, and RC3. At the point in time when the callback RC4 is entered, the sequence of pending callbacks in the list content 41 is RC2, RC1, RC3, RC4. For the communication shown in FIG. 1, the callbacks RC1, RC2, RC3, and RC4 are entered using the CCBS callback function. In addition or alternatively, the callbacks RC1, RC2, RC3, and RC4 can also use the CCNR callback function.

After the end of the telephone call 50 there is a blocked period 51, during which the target subscriber 5 is not reachable for callbacks. The blocked period 51 follows immediately after end of each conversation 50, 42, 24 of the target subscriber 5 and is entered into the switching unit in the form of configuration data. It makes the terminal of target subscriber 5 unreachable for callbacks for the duration of the blocked period 51, even though the telephone call 50 has ended. When the blocked period 51 ends, the terminal of the calling subscriber 2 is blocked for callbacks. The calling subscriber 2 has included data in the configuration data indicating blocked periods 22 before the beginning and after the end of a conference call 23. At the end of the blocked period 51 for the target subscriber 5, the conference call 23 has not yet begun. However, because the appointment for the conference call 23 and the blocked periods 22 before the beginning and after the end of the conference call 23 have been entered into the switching unit's configuration data, the calling subscriber 2 is unreachable for callbacks at the end of the blocked period 51. The configuration data also include activity status data for the calling subscriber 1 indicating that, according to the date planner 14 for the calling subscriber 1 in the program Microsoft Outlook, the calling subscriber 1 is away from his desk. There are also activity status data in the configuration data indicating that, at the end of the blocked period 51, the calling subscriber 3 is using the program Netmeeting 32, and it can be assumed that the calling subscriber 3 is currently participating in a conference call and does not wish to be disturbed by callbacks. Based on the unavailability of the calling subscribers 2, 1, and 3 for callbacks, the switching unit gives highest priority to the pending callback RC4 from calling subscriber 4 (see arrow 33). According to the list content 34, the sequence of pending callbacks at the time when the blocked period 51 ends is RC4, RC2, RC1, and RC3. Calling subscriber 4 is reachable, and based on the aforementioned prioritization the switching unit places the pending callback RC4, which leads to the callback from calling subscriber 4 and the second call 42 to the target subscriber 5 through the switching unit. After the connection is established between the calling subscriber 4 and the target subscriber 5, the sequence of pending callbacks in the list content 43 of the callback list RL is RC2, RC1, RC3.

During the second call 42 from calling subscriber 4 to target subscriber 5, calling subscriber 3 performs a cancellation 35 of his pending callback RC3 in the callback list RL. The cancellation occurs, for example, because the calling subscriber 3 has discovered, during the conference call in which he was participating through the Netmeeting program 32, that the reason for the callback to target subscriber 5 no longer exists. After the cancellation, the sequence of pending callbacks in the list content 36 is RC2, RC1.

After the end of the second call 42, as described above, the blocked period 51 for callbacks entered into the configuration data for the target subscriber 5 begins. When the blocked period 51 ends, the terminal of the calling subscriber 2 is busy, as described above, due to a blocked period 22 related to the conference call 23. At the end of the blocked period 51, the calling subscriber 1 is reachable. Due to the prioritizing of the pending callback RC2 from calling subscriber 2, who is included in the configuration data for the target subscriber 5 as a high-priority calling subscriber for callbacks, in the list content 54 of the callback list RL the pending callback RC1 is not placed even though calling subscriber 2 is reachable. Instead, based on the sequence for placing the pending callbacks in the list content 54, the switching unit waits until the blocked period 22 stored in the configuration data ends (see arrow 55). Then the switching unit places the callback to the calling subscriber 2, which leads to the second call 24 to the target subscriber 5, and deletes the pending callback RC2 in the list content 25 of the callback list RL. After the end of the second call 24, RC1 is contained as the only pending callback in the list content 25. The switching unit places the pending callback RC1 after the end of the blocked period 51 (see arrow 26). After the second call 24 is placed between the calling subscriber 2 and the target subscriber 5, the pending callback RC2 in the callback list RL is deleted by the switching unit.

FIG. 2 shows a schematic diagram of a switching unit according to an embodiment of the invention. Multiple calling terminals R, out of which each calling subscriber 1, 2, 3, 4 is using a calling terminal R, and a target terminal Z for target subscriber 5 are assigned to the switching unit 100. To distinguish the calling terminals R for each calling subscriber 1, 2, 3, 4, the references R for the calling terminals are followed by the references for calling subscribers 1, 2, 3, 4. The calling terminal Z of target subscriber 5 is connected by a cable 119 and an interface 109 to a processing unit 102 and a first storage unit 101. The calling terminals R1, R2, R3, R4 are connected by a cable 118 and an interface 108 to a processing unit 102 and a second storage unit 103.

If the target terminal Z is busy or unreachable at the time of a first call from one of the calling terminals R1, R2, R3, R4 to the target terminal Z, the calling subscriber 1, 2, 3, 4 initiates a callback request CCBS-REQ; CCNR-REQ, which is transmitted over the cable 118, the interface 108, and a cable 114 to the second storage unit 103 of the switching unit 100. In the second storage unit, as shown in FIG. 1 above, the callback request CCBS-REQ; CCNR-REQ is stored in the form of a callback RC (not shown) in a callback list RL (not shown) to be made by the switching unit 100. The callback list RL includes callbacks RC to be made by the switching unit 100 for establishing a second call to the target subscriber 5, wherein, in particular, all pending callbacks RC to a target subscriber 5 from the callback list RL are included and stored in the second storage unit 103.

The switching unit 100 includes a processing unit 102 that sets the time for placing the callback RC to be made by the switching unit 100 to each calling subscriber 1, 2, 3, 4 in order to generate a second call to the target subscriber 5, by processing the configuration data concerning the accessibility of target subscriber 5 for a callback, to a time when the target subscriber 5 is reachable by a callback. The configuration data regarding the accessibility of target subscriber 5 for a callback are entered into a first storage unit 101. Entries into the configuration data are made by target subscriber 5, for example, as follows: the target subscriber 5 reads the configuration data from the first storage unit 101 through a cable 115, the interface 109, and the cable 119 using his terminal Z and enters new or changed data into the configuration data through his terminal Z. Alternatively or in addition to the terminal Z, the target subscriber 5 can use a computer connected to the cable 119 (not shown) to enter the configuration data. The new or changed data are transmitted over the cable 119, the interface 109, and the cable 115 to the first storage unit 101 and are stored in the first storage unit 101. In addition to the target subscriber 5, each calling subscriber 1, 2, 3, 4 can also enter configuration data in the first storage unit 101, e.g., in the form of certain time frames in which the calling subscribers 1, 2, 3, 4 are reachable or unreachable for callbacks placed by the switching unit. The new or changed configuration data entered by the calling subscriber 1, 2, 3, or 4 are transmitted from the calling terminal R1, R2, R3, or R4 through the cable 118, the interface 108, a cable 116, the processing unit 102, and a cable 112 to the first storage unit 101 and are stored in the first storage unit 101. Alternatively or additionally, each terminal R1, R2, R3, R4 can bypass the processing unit 102 and be connected to the first storage unit 101.

In addition to direct access to the configuration data entered into the first storage unit 101 by each calling subscriber 1, 2, 3, 4 and by the target subscriber 5, access to the data entered in the first storage unit 101 is also possible through a first interface 110 connected to the first storage unit 101. Data regarding an activity status for the target subscriber 5 and/or the calling subscriber 1, 2, 3, 4 managed outside of the switching unit are entered into the configuration data via the first interface 110 provided in the switching unit 100. In the present exemplary embodiment, the activity status data are managed in a computer 104 that is connected to the first interface 110 through the cable 120. Data from a date planner for each calling subscriber 1, 2, 3, 4 or for the target subscriber 5 can be entered in the activity status data. The date planner data can be read by the computer 104 from software programs such as Lotus Notes or Microsoft Outlook that are installed on a computer (not shown) belonging to each calling subscriber 1, 2, 3, 4 or to the target subscriber 5. The computer 104 transfers the activity status data through the cable 120 and the first interface 110 to the first storage unit 101, in which the activity status data are added to the existing configuration data. The activity status data can additionally include data that are generated by the computer 104 for the purpose of recording and reporting the user activities of each calling subscriber 1, 2, 3, 4 or the target subscriber 5. The computer 104 can also consist of multiple physically separate units, which can be connected to each other and are connected to the first storage unit 101 through the cable 120 and the first interface 110.

An entered callback request CCBS-REQ; CCNR-REQ can be deleted from outside of the switching unit before the callback RC is made, using a second interface 111 provided in the switching unit. For this deletion, the second storage unit is connected through the second interface 111 to a device 105 outside of the switching unit 100 through a cable 121. The device 105 can be a computer or a server. For example, the computer or server can be running CEBP processes used to make telephone connections automatically. It is also possible for each calling subscriber 1, 2, 3, 4, using his terminal R1, R2, R3, R4 or a computer, to access the second storage unit 103 through the cable 121 and the interface 111, in order to delete an entered callback request CCBS-REQ; CCNR-REQ for a callback RC that has not yet been placed (not shown in FIG. 2).

After a callback request CCBS-REQ; CCNR-REQ has been left in the form of a pending callback RC through the cable 118, the interface 108, and the cable 114 in the second storage unit 103, the processing unit 102 receives a pending callback RC through a cable 113 from the callback list RL stored in the second storage unit 103. Through a cable 112, the processing unit 102 calls up configuration data regarding the reachability of the calling subscriber 1, 2, 3, 4 and the target subscriber 5 left in the first storage unit 101. If the configuration data indicate that the calling subscriber 1, 2, 3, 4 and the target subscriber 5 are reachable at the time when the pending callback RC is received by the processing unit 102, then the processing unit 102 queries through the cable 117, the interface 109, and the cable 119 to see whether the terminal Z of the target subscriber 5 indicates a ringback tone. If the terminal Z is free, a callback is sent from the processing unit 102 through the cable 116, the interface 108, and the cable 118 to the terminal R1, R2, R3, R4 of the respective calling subscriber 1, 2, 3, 4, whose callback request is processed by the switching unit 100. If the calling subscriber 1, 2, 3, 4, accepts the pending callback RC and the terminal Z is free at the time when the pending callback RC is accepted by the calling subscriber 1, 2, 3, 4, then the processing unit 102 places a second call, also called a callback connection, through the cable 118, the interface 108, the cable 116, the cable 117, the interface 109, and the cable 119 to the terminal Z of the target subscriber 5. After the callback connection is established, the pending callback RC is deleted from the callback list RC that is stored in the second storage unit 103 by the processing unit 102 through the cable 113.

The processing unit 102 receives the next pending callback RC through a cable 113 from the callback list RL stored in the second storage unit 103. At the time when the next pending callback RC is received, the processing unit 102, through a cable 112, calls up configuration data left in the first storage unit 101 regarding the reachability of the calling subscriber 1, 2, 3, 4 who initiated the callback request CCBS-REQ; CCNR-REQ and the target subscriber 5. If the calling subscriber 1, 2, 3, 4 and/or the target subscriber 5 is not reachable after the configuration data are processed, the processing unit checks the accessibility of each callback participant 1, 2, 3, 4, 5 by processing the configuration data left in the first storage unit 101 for a time when both callback participants 1, 2, 3, 4, 5 are reachable. If multiple pending callbacks RC for establishing a second call to the target subscriber 5 are available in the second storage unit 103, the processing unit 102, through the cable 113, prioritizes the sequence of pending callbacks RC in the second storage unit 103 by means of the processing unit 102, through the cable 112, accessing the configuration data left in the first storage unit 101 and processing that configuration data.

At the time when both callback participants are reachable, the processing unit 102 makes the callback to the calling subscriber 1, 2, 3, 4 who left the callback request CCBS-REQ; CCNR-REQ to be processed in the second storage unit, in order to generate the second call to the target subscriber 5.

One or more of the invention features described in the illustrated exemplary embodiments, such as management of the activity status data in the computer 104, which is connected to the first interface 110 through the cable 120 according to FIG. 2 and the corresponding description, can also apply to other embodiments of the invention, e.g., to more than the 4 calling subscribers 1-4 according to FIG. 2 and the corresponding description, except when stated otherwise or impossible for technical reasons.

What is claimed is:
1. A method of telecommunication comprising:
receiving, by the switching unit, a first callback request that requests a first callback after a first call attempted from a calling terminal of a calling subscriber to a target terminal of a target subscriber is unanswered;
receiving, by the switching unit, configuration data regarding accessibility of the target subscriber for the first callback, the configuration data regarding accessibility of the target subscriber for the first callback comprising data regarding a time period in which the target subscriber is reachable for the first callback and a time period in which the target subscriber is unreachable for the first callback;

receiving, by the switching unit, configuration data regarding accessibility of the calling subscriber for the first callback;

the switching unit setting a set time for the switching unit to initiate the first callback to generate a second call between the calling terminal and the target terminal based on the configuration data concerning the accessibility of the target subscriber and the configuration data concerning the accessibility of the calling subscriber such that the set time is a time at which both the target subscriber and the calling subscriber are reachable for the first callback;

the switching unit transmitting an appointment request to a date planning system or a conference system managed outside of the switching unit, the appointment request identifying the set time for the switching unit to initiate the first callback, the appointment request configured to communicate a meeting appointment for the target subscriber and the calling subscriber at the set time so that the conference system or the date planning system is updateable for the target subscriber and the calling subscriber based on the appointment request;

the switching unit initiating the first callback at the set time;

managing a callback list of the target subscriber such that a priority of the first callback within the callback list is adjusted so that the first callback has a higher priority than an earlier entered second callback on the callback list based on information relating to at least one of the calling subscriber and the first call; and wherein the switching unit automatically sets the set time for the switching unit to initiate the first callback; and wherein the configuration data regarding accessibility of the calling subscriber comprises date planner data of the calling subscriber.

2. The method of claim 1, wherein the first call attempt is unanswered when the first call attempt is a Call Completion on Busy Subscriber (CCBS) event or a Call Completion on No Reply (CCNR) event.

3. The method of claim 1, wherein the first call attempt is unanswered when the first call attempt is a Call Completion on Busy Subscriber (CCBS) event.

4. The method of claim 1, wherein the managing of the callback list comprises:
assigning a higher priority to the first callback over a second callback of the callback list that was entered in the callback list earlier than the first callback.

5. The method of claim 1, wherein the information relating to the first calling subscriber comprises information identifying an importance of the first calling subscriber.

6. The method of claim 1, comprising:
blocking the calling terminal and the target terminal for calls other than a second call of the first callback before the first callback is initiated.

7. The method of claim 1, further comprising:
prioritizing the first callback within a list of callbacks of the target subscriber.

8. The method of claim 1, further comprising:
sending an acknowledgement message from the switching unit to the calling terminal after the first callback request is received.

9. The method of claim 1, comprising:
the date planning system or the conference system updating a profile for the target subscriber and updating a profile for the calling subscriber based on the appointment request received from the switching unit.

10. The method of claim 9, wherein the appointment request is configured so the appointment request is enterable as an e-mail or a short message system message by the date planning system or the conference system.

11. The method of claim 1, comprising:
entering configuration data regarding accessibility of the calling subscriber into the switching unit via a first interface of the switching unit, the configuration data of the calling subscriber comprising activity status data associated with the calling subscriber; and
entering the configuration data regarding accessibility of the target subscriber into the switching unit via the first interface, the configuration data of the target subscriber comprising activity status data associated with the target subscriber;
wherein the activity status data associated with the calling subscriber is managed outside the switching unit and wherein the activity status data associated with the target subscriber is managed outside the switching unit.

12. The method of claim 11, wherein the activity status data associated with the calling subscriber comprises data generated by a computer for recording and reporting of activities of the calling subscriber.

13. The method of claim 1, wherein the receiving, by the switching unit, of the configuration data regarding accessibility of the target subscriber comprises the switching unit receiving activity status messages providing presence data relating to the target subscriber from a computer based unit, the computer based unit configured to monitor a presence of the target subscriber and a presence of the calling subscriber.

14. The method of claim 13, wherein at least one of the activity status messages providing presence data relating to the target subscriber indicates one of:
that the target subscriber is within an office in which the target terminal is located, and
that the target subscriber is within a moving vehicle.

15. The method of claim 14, wherein the switching unit manages a callback list of the target subscriber.

\* \* \* \* \*